United States Patent
Mayne et al.

(10) Patent No.: US 10,926,878 B2
(45) Date of Patent: Feb. 23, 2021

(54) PASSENGER TRAY WITH INTEGRATED USER INTERFACE DEVICE

(71) Applicant: Rockwell Collins, Inc., Cedar Rapids, IA (US)

(72) Inventors: Peter Mayne, London (GB); Daniel Flashman, London (GB); Aaron D. LaPrade, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 43 days.

(21) Appl. No.: 16/114,620

(22) Filed: Aug. 28, 2018

(65) Prior Publication Data

US 2020/0070982 A1 Mar. 5, 2020

(51) Int. Cl.
*B64D 11/00* (2006.01)
*B64D 11/06* (2006.01)
*B60N 3/00* (2006.01)
*G06F 3/0482* (2013.01)

(52) U.S. Cl.
CPC ........ *B64D 11/00155* (2014.12); *B60N 3/002* (2013.01); *B64D 11/0605* (2014.12); *B64D 11/0638* (2014.12); *G06F 3/0482* (2013.01)

(58) Field of Classification Search
CPC .......... B64D 11/00155; B64D 11/0605; B64D 11/0638; B64D 11/0015; B60N 3/002; G06F 3/0482
USPC ....................................................... 297/217.3
See application file for complete search history.

(56) References Cited

U.S. PATENT DOCUMENTS

| | | | |
|---|---|---|---|
| 9,128,594 B1 * | 9/2015 | Hufnagel | G06F 3/04845 |
| 9,205,914 B1 | 12/2015 | Fagan et al. | |
| 2003/0184957 A1 * | 10/2003 | Stahl | B60N 3/004 361/679.1 |
| 2006/0075934 A1 * | 4/2006 | Ram | B60N 3/004 108/44 |
| 2008/0061609 A1 * | 3/2008 | Williamson | B60K 35/00 297/217.3 |
| 2011/0141057 A1 * | 6/2011 | Sizelove | B60N 3/004 345/174 |
| 2011/0219408 A1 * | 9/2011 | Frisco | H04N 7/18 725/77 |

(Continued)

FOREIGN PATENT DOCUMENTS

| | | |
|---|---|---|
| GB | 2340389 A | 2/2000 |
| WO | 2014075040 A1 | 5/2014 |

OTHER PUBLICATIONS

Extended EP Search Report dated Jan. 30, 2020 for EP Application No. 19194017.0.

*Primary Examiner* — Mark R Wendell
(74) *Attorney, Agent, or Firm* — Suiter Swantz pc llo

(57) ABSTRACT

A passenger tray with an integrated user interface device is disclosed. In embodiments, a passenger tray assembly includes a passenger tray with a cavity defined in a surface of the passenger tray. A user interface device is disposed within the cavity. The user interface device includes a capacitive touch interface that is configured to generate signals for controlling one or more electronic components in a passenger environment. For example, the capacitive touch interface can be configured to generate signals for controlling an in-flight entertainment device, an actuator of a passenger chair, a passenger light system, and/or a flight attendant alert system.

15 Claims, 7 Drawing Sheets

(56) References Cited

U.S. PATENT DOCUMENTS

| | | | |
|---|---|---|---|
| 2013/0070171 A1* | 3/2013 | Boyer, Jr. | H04N 5/655 348/837 |
| 2013/0093220 A1* | 4/2013 | Pajic | B64D 11/0015 297/163 |
| 2016/0170499 A1 | 6/2016 | Jiang et al. | |

* cited by examiner

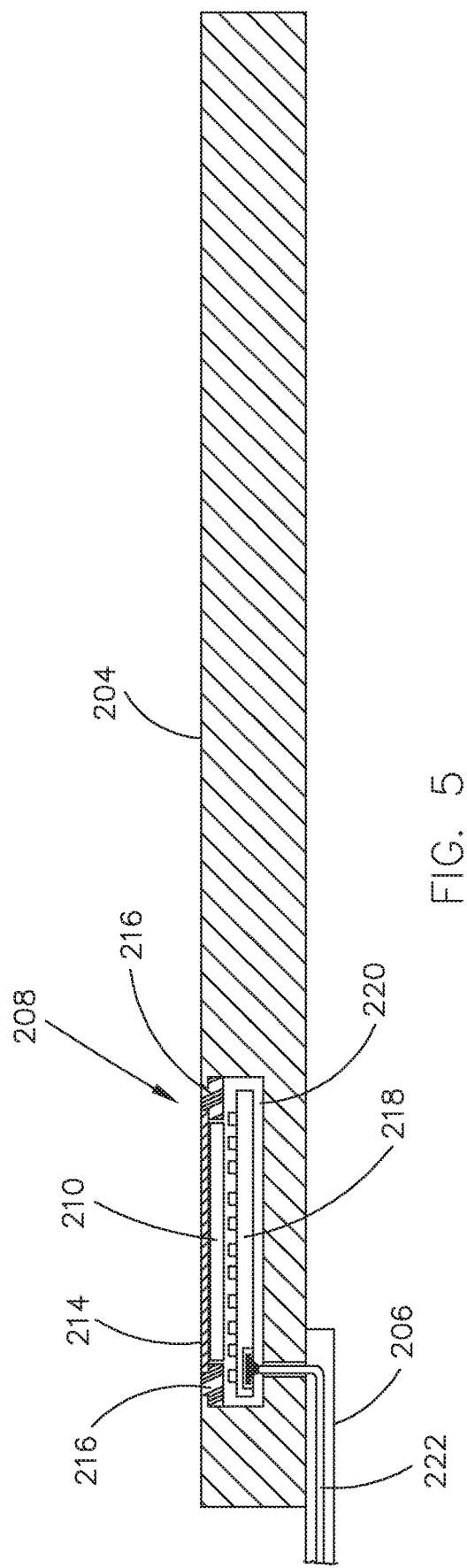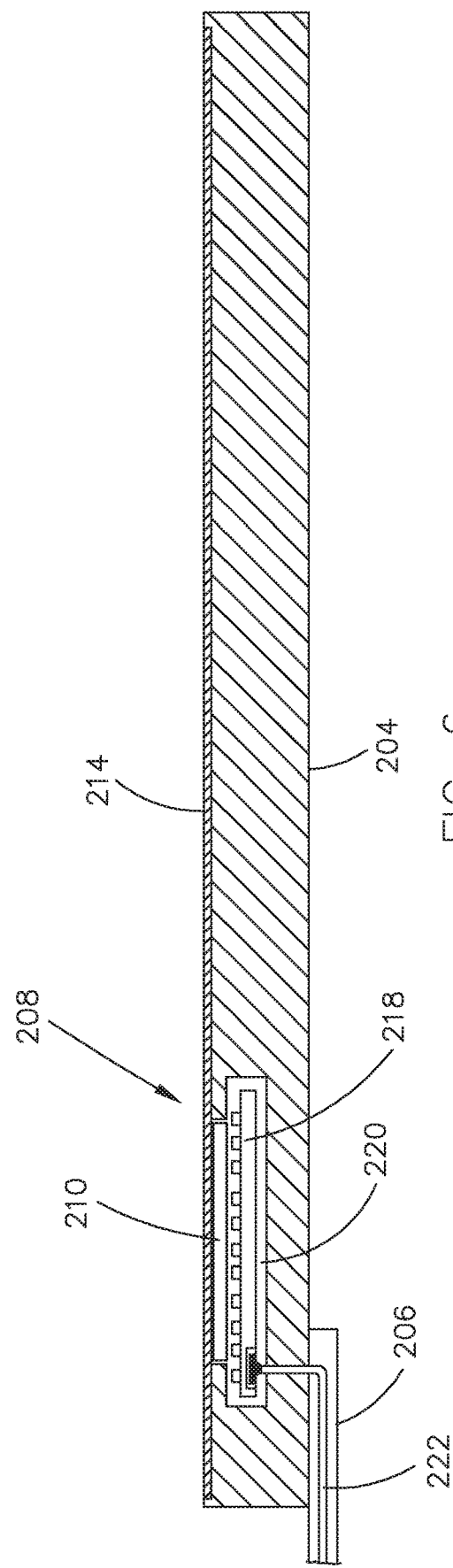

PASSENGER TRAY WITH INTEGRATED USER INTERFACE DEVICE

BACKGROUND

Vehicles for mass transport can include, but are not limited to, aircrafts, boats, trains, and busses. Passenger cabins in these types of vehicles are typically designed for long travel durations (e.g., one or more hours of travel). As such, the passenger cabins are often equipped with adjustable (e.g., reclining) passenger chairs, in-flight entertainment (IFE) devices, and passenger trays that can be used when passengers want to eat, drink, read, write, use portable devices (e.g., laptops, tablets, etc.), and so forth.

When passenger trays are deployed (e.g., for use while eating), the passenger trays can make it difficult for seated passengers to access controls for IFE devices, passenger chair actuators, and/or other controls (e.g., flight attendant call button, etc.) that may be built into an armrest, center console, or the like. This inconveniences passengers, and in some cases, passengers may even spill a food or beverage while attempting to reach the controls. Accordingly, there is a need for passenger tray systems that do not limit passenger access to controls when the passenger trays are deployed.

SUMMARY

In one aspect, embodiments of the inventive concepts disclosed herein are directed to a passenger tray with an integrated user interface device. In embodiments, a passenger tray assembly includes a passenger tray with a cavity defined in a surface of the passenger tray. A user interface device is disposed within the cavity. The user interface device includes a capacitive touch interface that is configured to generate signals for controlling one or more electronic components in a passenger environment. For example, the capacitive touch interface can be configured to generate signals for controlling an in-flight entertainment device, an actuator of a passenger chair, a passenger light system, and/or a flight attendant alert system.

In some embodiments, the passenger tray assembly further includes a tray support member coupled to the passenger tray and configured to support the passenger tray in stowed and deployed configurations. The passenger tray assembly may include one or more signal paths (e.g., wires, traces, cables, etc.) extending from the cavity through a portion of the passenger tray and along or through the tray support member to communicatively couple the user interface device with one or more electronic components (e.g., in-flight entertainment device, actuator of a passenger chair, passenger light system, flight attendant alert system, etc.) and/or to a controller that is communicatively coupled to the one or more electronic components.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5 is a cross-sectional side view of the passenger tray with the integrated user interface device, in accordance with an example embodiment of this disclosure;

FIG. 6 is a cross-sectional side view of the passenger tray with the integrated user interface device, where the passenger tray includes a continuous cover layer that extends over the passenger tray surface and the integrated user interface device, in accordance with an example embodiment of this disclosure;

DETAILED DESCRIPTION

Figure 1:
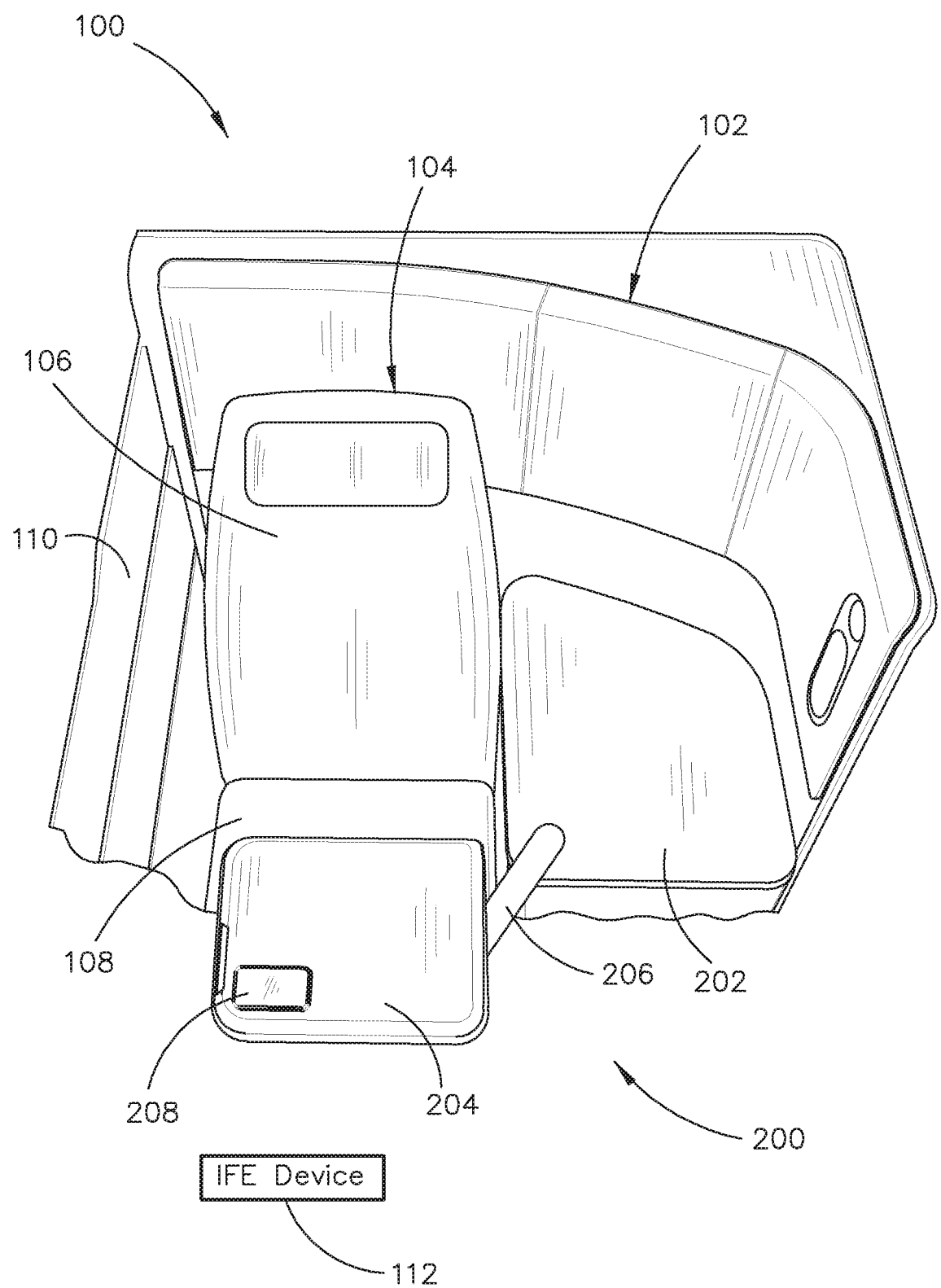
FIG. 1 is a perspective view of a passenger seating system that includes a passenger tray with an integrated user interface device, in accordance with an example embodiment of this disclosure.
Figure 2:
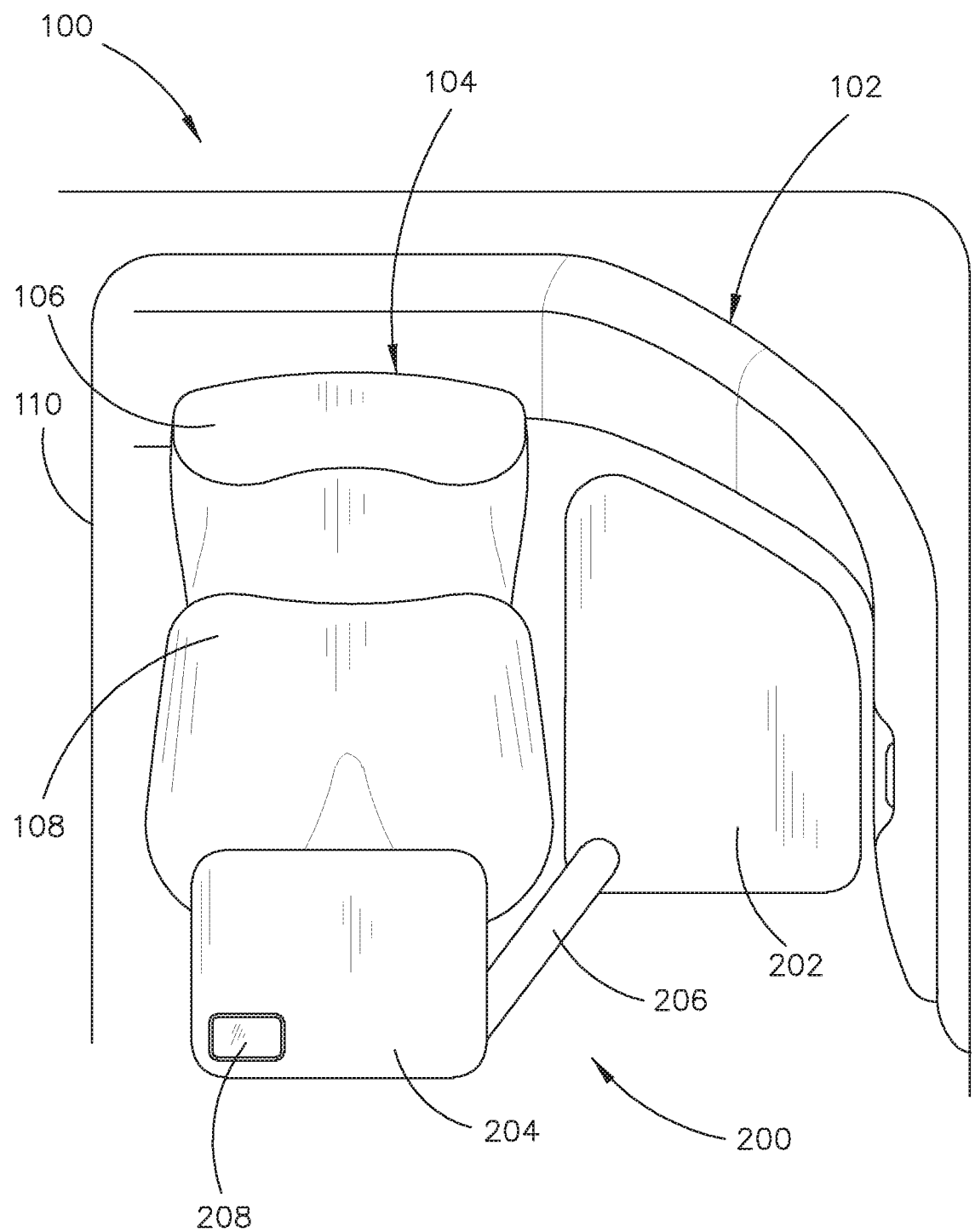
FIG. 2 is a top view of the passenger seating system that includes the passenger tray with the integrated user interface device, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger tray with an integrated user interface device. When a passenger tray (e.g., meal, beverage, and/or activity tray) is deployed, the passenger tray may make it difficult for seated passengers to access controls for an in-flight entertainment (IFE) device (e.g., a media display device, audio device, and/or gaming device) or other controls (e.g., passenger chair controls, light system controls, flight attendant call button, etc.) that may be built into an armrest, center console, or the like. This inconveniences passengers, and in some cases, passengers may even spill a food or beverage while attempting to reach the controls. Accordingly, a passenger tray that does not limit passenger access to controls is disclosed.

In embodiments of the present disclosure, a passenger tray assembly includes a passenger tray with an integrated user interface device for controlling IFE devices and/or other passenger-accessible devices (e.g., passenger chair actuators, passenger light systems, flight attendant alert/communication systems, window shade and/or partition actuators, any combination thereof, and so forth). Various embodiments are described below with reference to FIGS. 1 through 7B.

FIG. 1 illustrates a passenger seating system 100 that includes a passenger tray assembly 200 with a passenger tray 204 having a user interface device 208 integrated within the passenger tray 204. The passenger seating system 100 may include passenger seating modules 102, rows, or the like, in a passenger cabin of an aircraft or any other vehicle.

In an example embodiment, the passenger tray assembly 200 is incorporated into a seating module 102 (e.g., a business-class or elite-class compartment) aboard a commercial aircraft or like seating area aboard a business jet or luxury aircraft.

The seating module 102 includes passenger chair 104. In embodiments, the passenger chair 104 includes an upper body support member 106 (e.g., a seat back) and a seat 108. In some embodiments, the upper body support member 106 and the seat 108 may be separate structures disposed adjacent to one another. Alternatively, the upper body support member 106 and the seat 108 can have one or more shared components. For example, the upper body support member 106 and the seat 108 can have a shared cushion or covering, one or more shared mechanical linkages, and/or one or more shared actuators. The upper body support member 106 may be configured to move relative to the seat 108. For example, the upper body support member 106 can be configured to transition between upright and reclined positions. In some embodiments, the seat 108 is also repositionable. For example, the seat 108 may be configured to move forward/backward, upward/downward, and/or tilt. The seat 108 and the upper body support member 106 may be simultaneously actuated to transition from a sitting to a laying position. For example, the seat 108 may actuate forwards while the upper body support member 106 reclines to place the passenger chair 104 in a bed-like configuration. In some embodiments, the passenger chair 104 can also include one or more armrests 108 or armrest consoles adjacent to (e.g., on a left or right side) of the seat 108.

The seating module 102 may further include at least one partition 110 for partially demarcating the passenger chair 104 from the cabin proper (e.g., defining a private area or a communal area). In embodiments, the seating module 102 can include a manually actuated partition 110 or an automated partition 110. For example, in some embodiments, the partition 110 may be manually actuated (e.g., raised, lowered, slid, unfolded, latched/unlatched, etc.) to open or close an entrance to the seating module 102. In other embodiments, the partition 110 may be transitioned between open and closed positions by one or more actuators (e.g., motors, linear actuators, or the like). In some embodiments, the seating module 102 may include one or more control interfaces that generate signals to cause the actuators to open or close the partition 110 based upon a user interaction (e.g., pressed button, toggled switch, etc.).

In embodiments, the passenger seating system 100 includes an IFE device 112 for each passenger or group of passengers. For example, the IFE device 112 may include a media display device (e.g., an LCD, LED display, OLED display, or the like) for viewing streamed or recorded content (e.g., TV shows, movies, etc.), travel updates (e.g., flight tracking map, altitude, speed, outside air temperature, distance/time to destination, weather updates, and so forth). The IFE device 112 may be integrated (e.g., at least partially embedded) within or coupled to another passenger chair, a wall structure, a console, or the like. The IFE device 112 can also include an audio output device (e.g., speaker(s), audio output jack, and/or wireless transmitter (e.g., Bluetooth audio transmitter)). In some embodiments, the IFE device 112 includes a touchscreen display or other user input device (e.g., controller) that can be used to navigate the IFE device 112 menus, play, pause, stop, fast forward, and/or rewind, and/or interact with game media (e.g., video games, trivia games, etc.).

The passenger tray assembly 200 can be implemented within the seating module 102. However, this is one example implementation, and in other embodiments, the passenger tray assembly 200 may be implemented in a differently configured passenger seating system 100.

As shown in FIGS. 1 through 4, the passenger tray assembly 200 includes a base member 202 and a passenger tray 204 that is coupled to the base member 202 by at least one tray support member 206. In embodiments, the base member 202 can be attached to or can make up a portion of an arm rest, a center console, a pedestal, a wall, another passenger chair, or any other fixture in the passenger cabin that is adjacent to the passenger chair 104. The tray support member 206 can be coupled to the passenger tray 204 and configured to support the passenger tray 204 in stowed and deployed configurations. For example, the tray support member 206 may be configured to suspend the passenger tray 204 from the base member 202 so that the passenger tray 204 can be repositioned by pulling/pushing the passenger tray in a manner that causes the tray support member 206 to extend, swing, or rotate out from the base member 202.

In some embodiments, the passenger tray assembly 200 may include a base member 202, passenger tray 204, and tray support member 206 configured as described in U.S. patent application Ser. No. 16/114,450, filed Aug. 28, 2018, titled "Timed Passenger Tray with Infinite Position," and naming Peter Mayne, Daniel Flashman, and Aaron D. LaPrade as inventors, which is incorporated herein by reference in its entirety. In other embodiments, the passenger tray 204 may be supported by one or more (e.g., two) tray support members 206 that are coupled to a seatback of another passenger chair, or the passenger tray 204 may be configured to fold out of a compartment in an arm rest or center console, or may be deployable by another mechanism now or hereafter employed on aircrafts.

In some embodiments, the passenger tray assembly 200 may also be at least partially automated. For example, the passenger tray assembly 200 can include at least one actuator (e.g., a motor) configured to extend, rotate, swing, or otherwise deploy the tray support member 206.

The passenger tray assembly 200 includes a user interface device 208 integrated (e.g., at least partially embedded) within the passenger tray 204. For example, as shown in FIGS. 5 and 6, a cavity 220 is defined in a surface of the passenger tray 204, and the user interface device 208 is disposed within the cavity 220. In some embodiments, the user interface device 208 is fully disposed within the cavity 220. For example, an outer surface of the user interface device 208 may be flush with the surface of the passenger tray 204 or set slightly below the surface of the passenger tray 204. The user interface device 208 includes a capacitive touch interface 210 (e.g., a capacitive touchpad, capacitive touchscreen, and/or one or more capacitive touch sensors). The capacitive touch interface 210 can be configured to generate signals for controlling an IFE device (e.g., IFE device 112) and/or other passenger-accessible devices (e.g., passenger chair actuators, passenger light systems, flight attendant alert/communication systems, window shade and/or partition actuators, any combination thereof, and so forth).

Figure 3:
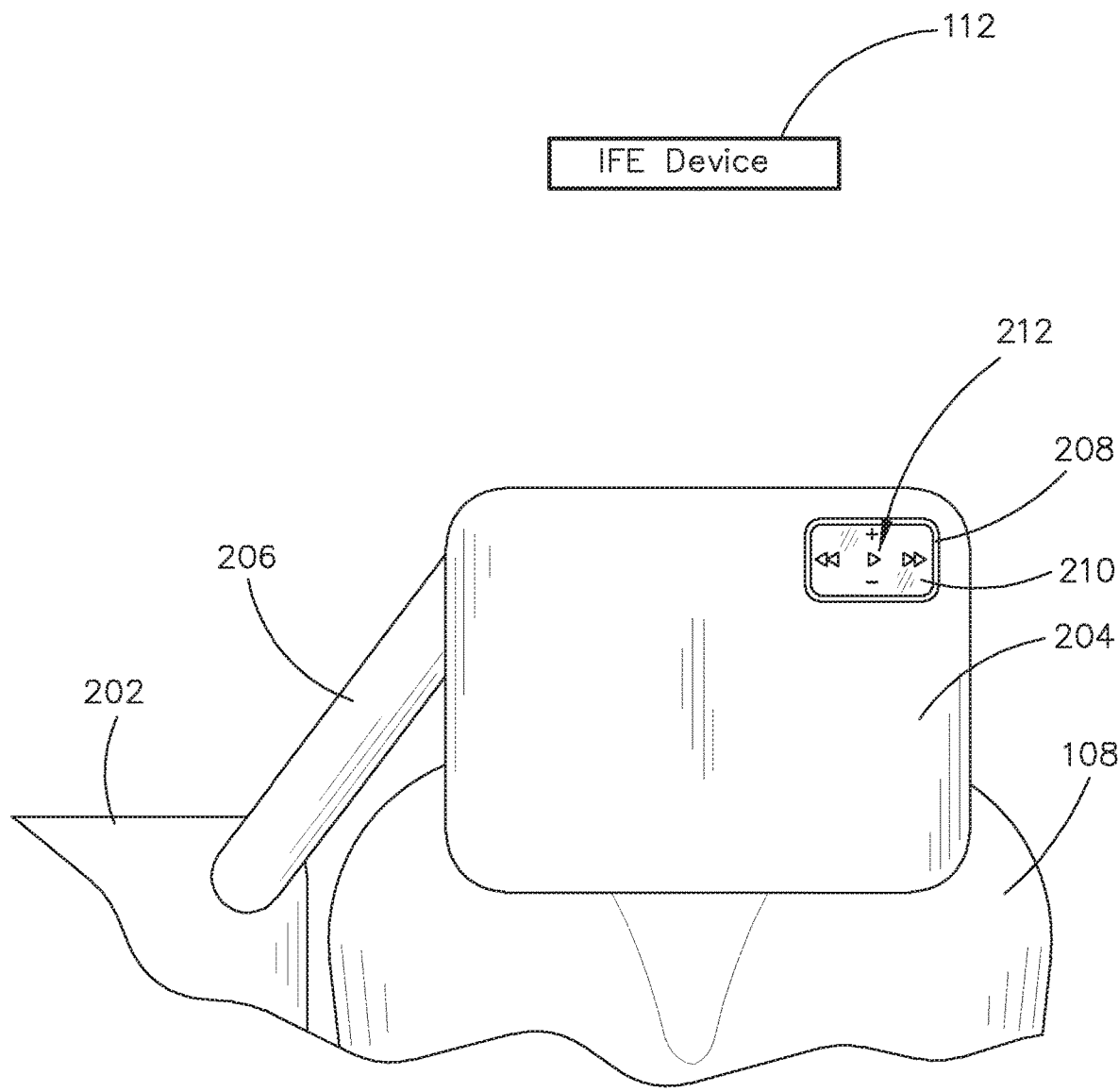
FIG. 3 is a zoomed-in view of the passenger tray with the integrated user interface device, in accordance with an example embodiment of this disclosure.

As shown in FIG. 3, in embodiments, the user interface device 208 includes icons 212 that indicate control actions (e.g., play, pause, stop, fast forward, rewind, next, back, on/off, etc.) associated with respective portions of the capacitive touch interface 210. For example, in embodiments where the capacitive touch interface 210 is a capacitive touchpad or one or more capacitive touch sensors, the user interface device 208 may include icons 212 formed over (e.g., printed or other applied to) an outer surface of the capacitive touchpad to indicate control actions associated with respective portions of the capacitive touchpad. In another example embodiment, that capacitive touch interface 210 is a capacitive touchscreen that can be configured to display icons 212 that indicate control actions associated with respective portions of the capacitive touchscreen.

Figure 4:
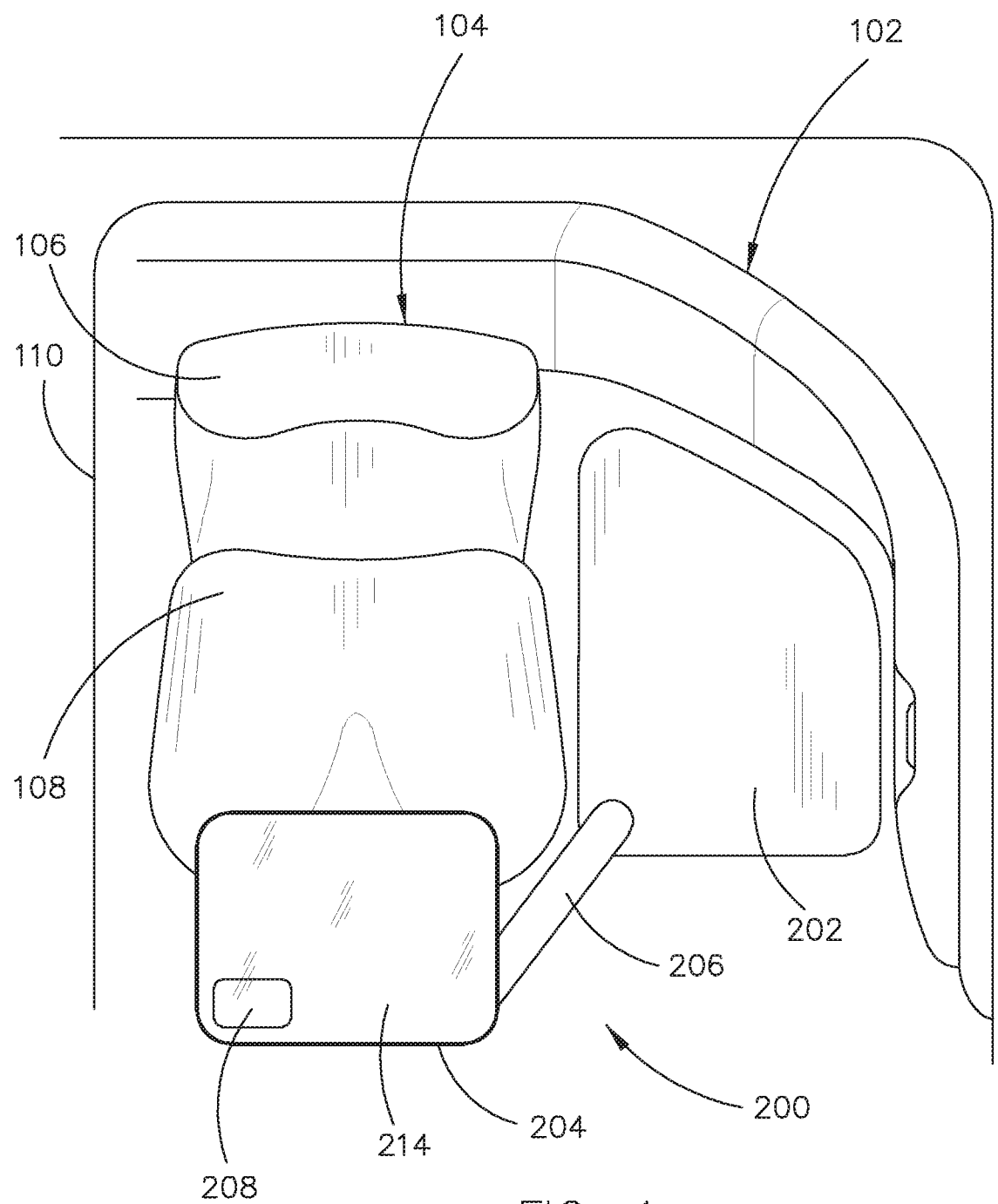
FIG. 4 is a top view of the passenger seating system that includes the passenger tray with the integrated user interface device, where the passenger tray includes a continuous cover layer that extends over the passenger tray surface and the integrated user interface device, in accordance with an example embodiment of this disclosure.

Referring again to FIGS. 5 and 6, the user interface device 208 may be sealed from moisture, dust, or other debris by a cover layer 214 (e.g., a transparent cover layer) and/or gasket material 216 (e.g., rubber, foam, resin, and/or epoxy) disposed about the user interface device 208 to seal the space between the user interface device 208 and the cavity 220. In an example embodiment shown in FIG. 5, the user interface device 208 has a cover layer 214 disposed upon the capacitive touch interface 210 and gasket material 216 disposed between the edges of the cavity 220 and the capacitive touch interface 210 and/or cover layer 214. In some embodiments, the cover layer 214 makes up a portion (e.g., an outermost layer) of the capacitive touch interface 210. In another example embodiment shown in FIG. 6 (and FIG. 4), the passenger tray 204 has a cover layer 214 extending over the user interface device 208 and at least a portion of the surface of the passenger tray 204. In some embodiments, the cover layer 214 extends over the cavity 220 and the entire surface of the passenger tray 204 (e.g., as shown in FIGS. 4 and 6) so that the user interface device 208 is seamlessly integrated within the surface of the passenger tray 204 and is protected from spills or any other form of moisture or debris that can potentially damage the user interface device 208.

The user interface device 208 can include a printed board 218 (e.g., a printed circuit board (PCB), printed wiring board (PWB), or the like) coupled to and/or forming a portion of the capacitive touch interface 210. The printed board 218 may include connectors (e.g., pins, sockets, ports, etc.) that can be coupled to one or more signal paths 222 (e.g., wires, cables, traces, etc.). In embodiments, one or more signal paths 222 extend from the cavity 220 through a portion of the passenger tray 204 and along or through the tray support member 206. The one or more signal paths 222 can be configured to communicatively couple the user interface device 208 with an IFE device (e.g., IFE device 112) and/or other passenger-accessible devices (e.g., passenger chair actuators, passenger light systems, flight attendant alert/communication systems, window shade and/or partition actuators, any combination thereof, and so forth). For example, in some embodiments, the user interface device 208 may be directly coupled to an IFE device (e.g., IFE device 112) and/or other passenger-accessible devices (e.g., passenger chair actuators, passenger light systems, flight attendant alert/communication systems, window shade and/or partition actuators, any combination thereof, and so forth). In other embodiments, the user interface device 208 may be coupled to a controller (or control system) that is configured to control an IFE device (e.g., IFE device 112) and/or other passenger-accessible devices (e.g., passenger chair actuators, passenger light systems, flight attendant alert/communication systems, window shade and/or partition actuators, any combination thereof, and so forth).

Figure 7A:
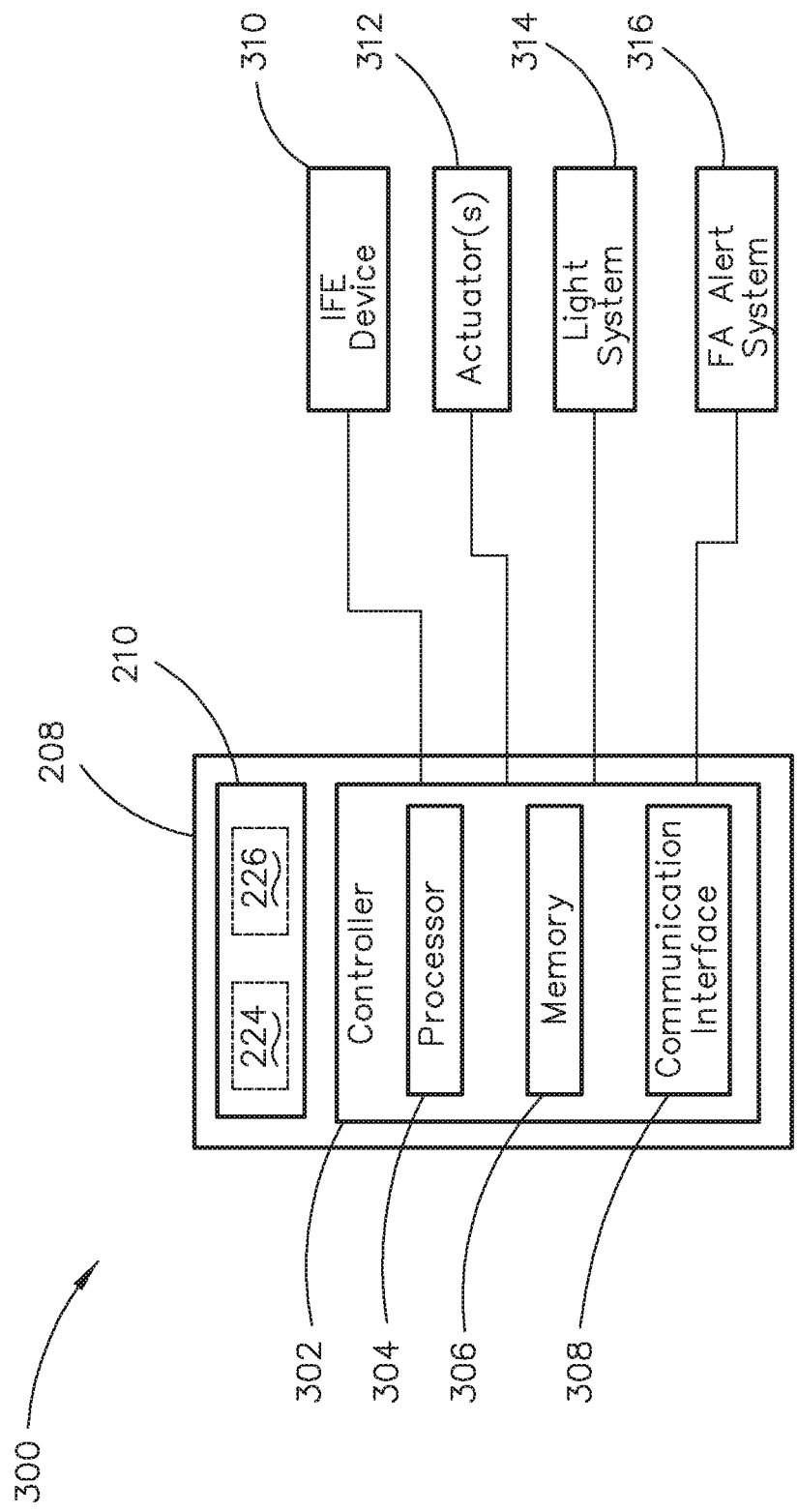
FIG. 7A is a block diagram illustrating electronic components of the passenger seating system that includes the passenger tray with the integrated user interface device, where the integrated user interface device includes a controller in communication with one or more controlled devices, in accordance with an example embodiment of this disclosure.
Figure 7B:
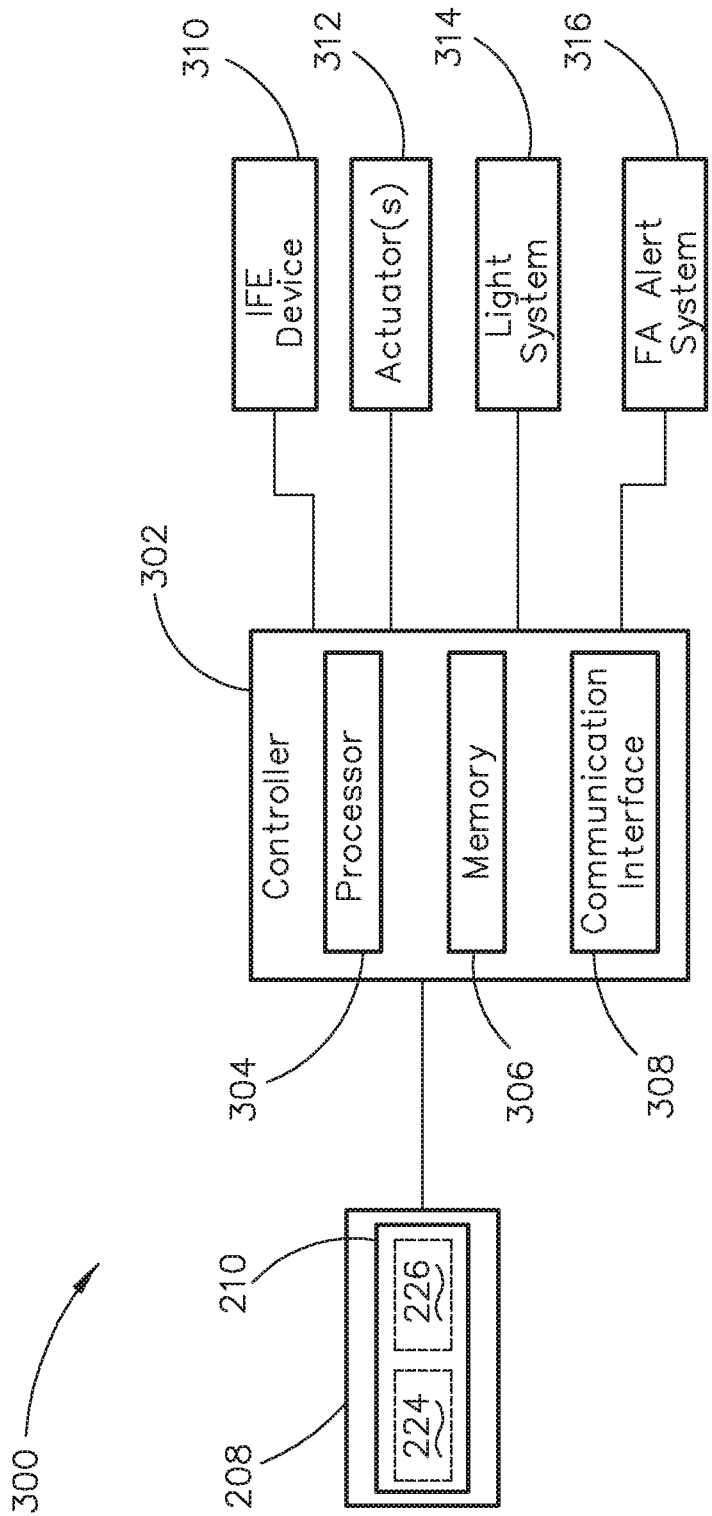
FIG. 7B is a block diagram illustrating electronic components of the passenger seating system that includes the passenger tray with the integrated user interface device, where the integrated user interface device is communicatively coupled to a controller in communication with one or more controlled devices, in accordance with an example embodiment of this disclosure.

FIGS. 7A and 7B illustrate example embodiments of a passenger tray system 300 of electronic components associated with the passenger tray assembly 200. In embodiments, the passenger tray system 300 includes the user interface device 208 having at least one capacitive touch interface 210 (e.g., capacitive touchscreen 224 and/or capacitive touchpad/sensor 226). The user interface device 208 may include a controller 302 (e.g., as shown in FIG. 7A) or can be communicatively coupled to the controller 302

(e.g., as shown in FIG. 7B). For example, the controller 302 may be embedded in or connected to the printed board 218, or the controller 302 can be communicatively coupled to the passenger tray assembly 200 via the one or more signal paths 222. These configurations are provided as examples; however, it is contemplated that variations on connectivity of the passenger tray system 300 can be implemented (e.g., including, but not limited to, wireless connectivity or a mixture of wired and wireless connectivity) without departing from the scope of this disclosure. Furthermore, any number of controllers 302 may be implemented. For example, the user interface device 208 may include or can be coupled to a respective controller 302 that communicates with another controller (e.g., for an IFE device and/or another passenger-accessible device).

In embodiments, the controller 302 includes a processor 304, memory 306, and a communication interface 308. The processor 304 provides processing functionality for at least the controller 302 and can include any number of processors, micro-controllers, circuitry, field programmable gate array (FPGA) or other processing systems, and resident or external memory for storing data, executable code, and other information accessed or generated by the controller 302. The processor 304 can execute one or more software programs embodied in a non-transitory computer readable medium (e.g., memory 306) that implement techniques described herein. The processor 304 is not limited by the materials from which it is formed or the processing mechanisms employed therein and, as such, can be implemented via semiconductor(s) and/or transistors (e.g., using electronic integrated circuit (IC) components), and so forth.

The memory 306 can be an example of tangible, computer-readable storage medium that provides storage functionality to store various data and/or program code associated with operation of the controller 302/processor 304, such as software programs and/or code segments, or other data to instruct the processor 304, and possibly other components of the controller 302, to perform the functionality described herein. Thus, the memory 306 can store data, such as a program of instructions for operating the controller 302, including its components (e.g., processor 304, communication interface 308, etc.), and so forth. It should be noted that while a single memory 306 is described, a wide variety of types and combinations of memory (e.g., tangible, non-transitory memory) can be employed. The memory 306 can be integral with the processor 304, can comprise stand-alone memory, or can be a combination of both. Some examples of the memory 306 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 308 can be operatively configured to communicate with components of the controller 302. For example, the communication interface 308 can be configured to retrieve data from the processor 304 or other devices (e.g., capacitive touch interface 210, IFE Device 310, actuator(s) 312, passenger light system 314, and/or flight attendant (FA) alert system 316), transmit data for storage in the memory 306, retrieve data from storage in the memory 306, and so forth. The communication interface 308 can also be communicatively coupled with the processor 304 to facilitate data transfer between components of the controller 302 and the processor 304. It should be noted that while the communication interface 308 is described as a component of the controller 302, one or more components of the communication interface 308 can be implemented as external components communicatively coupled to the controller 302 via a wired and/or wireless connection. In embodiments, the communication interface 308 includes or is coupled to a transmitter, receiver, transceiver, physical connection interface, or any combination thereof.

In embodiments, the capacitive touch interface 210 is configured to generate signals for controlling an IFE device 310 (e.g., IFE device 112, or the like), one or more actuators 312 for a passenger chair, window shade, partition, the passenger tray assembly 200 itself, or any other automated/semi-automated passenger-accessible device, a passenger light system 314, an FA alert system 316, and/or any other passenger-accessible device. The controller 302 can be configured to receive the signals from the capacitive touch interface 210 and generate instructions and/or control signals based on the capacitive touch interface 210 signals. The controller 302 can be further configured to transmit the instructions and/or control signals to the IFE device 310, one or more actuators 312, passenger light system 314, FA alert system 316, and/or other passenger-accessible device. In some embodiments, the controller 302 is configured to transmit the instructions and/or control signals directly to the IFE device 310, one or more actuators 312, passenger light system 314, FA alert system 316, and/or other passenger-accessible device. In other embodiments, the controller 302 is configured to transmit the instructions and/or control signals to at least one other controller or control system that is configured to control the IFE device 310, one or more actuators 312, passenger light system 314, FA alert system 316, and/or other passenger-accessible device.

In some embodiments, the controller 302 can be further configured to receive information from the IFE device 310 or another passenger-accessible device. For example, the controller 302 may receive information regarding a display or audio content output by the IFE device 310 (e.g., movie, TV show, flight information, game, safety alert, etc.). In some embodiments, the controller 302 may be configured to at least partially disable the capacitive touch interface 210 when safety alerts or other alerts that are directed at all passengers are broadcast or provided via the IFE device 310. In embodiments where the capacitive touch interface 210 is a capacitive touchscreen 224, the controller 302 may be configured to modify the display icons 212 based on the content being output by the IFE device 310. In some embodiments, the controller 302 can also be configured to provide visual feedback through the capacitive touchscreen 224 (e.g., to indicate volume, track bar display, lights on/off, actuator positions, etc.) based upon user inputs to the user interface device 208 and/or information received from the one or more passenger-accessible devices being controlled.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger tray assembly, comprising:
   a passenger tray with a cavity defined in a surface of the passenger tray;
   a tray support member coupled to the passenger tray and configured to support the passenger tray in stowed and deployed configurations;
   a user interface device disposed within the cavity, the user interface device including a capacitive touch interface, the capacitive touch interface being configured to generate signals for controlling an in-flight entertainment device;
   a cover layer extending over the user interface device and at least a portion of the surface of the passenger tray, wherein the cover layer forms a portion of the capacitive touch interface; and
   one or more signal paths for communicatively coupling the user interface device with the in-flight entertainment device, the one or more signal paths extending from the cavity through a portion of the passenger tray and along or through the tray support member.

2. The passenger tray assembly of claim 1, wherein the capacitive touch interface comprises a capacitive touchpad.

3. The passenger tray assembly of claim 2, wherein the user interface device includes control icons formed over the capacitive touchpad to indicate control actions associated with respective portions of the capacitive touchpad.

4. The passenger tray assembly of claim 1, wherein the capacitive touch interface comprises a capacitive touchscreen.

5. The passenger tray assembly of claim 4, wherein the capacitive touchscreen is configured to display control icons to indicate control actions associated with respective portions of the capacitive touchscreen.

6. The passenger tray assembly of claim 1, wherein the cover layer forms an outermost layer of the capacitive touch interface.

7. The passenger tray assembly of claim 1, wherein the capacitive touch interface is further configured to generate signals for controlling at least one of: an actuator of a passenger chair, a passenger light system, or a flight attendant alert system.

8. A passenger seating system, comprising:
   a passenger chair;
   an in-flight entertainment device viewable from the passenger chair;
   a passenger tray with a cavity defined in a surface of the passenger tray;
   a tray support member coupled to the passenger tray and configured to support the passenger tray in stowed and deployed configurations;
   a user interface device disposed within the cavity, the user interface device including a capacitive touch interface, the capacitive touch interface being configured to generate signals for controlling the in-flight entertainment device;
   a cover layer extending over the user interface device and at least a portion of the surface of the passenger tray, wherein the cover layer forms a portion of the capacitive touch interface; and
   one or more signal paths for communicatively coupling the user interface device with the in-flight entertainment device, the one or more signal paths extending from the cavity through a portion of the passenger tray and along or through the tray support member.

9. The passenger seating system of claim 8, wherein the capacitive touch interface comprises a capacitive touchpad.

10. The passenger seating system of claim 9, wherein the user interface device includes control icons formed over the capacitive touchpad to indicate control actions associated with respective portions of the capacitive touchpad.

11. The passenger seating system of claim 8, wherein the capacitive touch interface comprises a capacitive touchscreen.

12. The passenger seating system of claim 11, wherein the capacitive touchscreen is configured to display control icons to indicate control actions associated with respective portions of the capacitive touchscreen.

13. The passenger seating system of claim 8, wherein the cover layer forms an outermost layer of the capacitive touch interface.

14. The passenger seating system of claim 8, wherein the capacitive touch interface is further configured to generate signals for controlling at least one of: an actuator of a passenger chair, a passenger light system, or a flight attendant alert system.

15. The passenger seating system of claim 8, wherein the in-flight entertainment device comprises at least one of an audio output device or a display device.

* * * * *